(12) United States Patent
Zhang et al.

(10) Patent No.: US 10,929,818 B2
(45) Date of Patent: Feb. 23, 2021

(54) WEARABLE SENSOR-BASED AUTOMATIC SCHEDULING DEVICE AND METHOD

(71) Applicant: SEOUL NATIONAL UNIVERSITY R&DB FOUNDATION, Seoul (KR)

(72) Inventors: Byoung-Tak Zhang, Seoul (KR); Sang-Woo Lee, Seoul (KR); Donghyun Kwak, Yeoju-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 394 days.

(21) Appl. No.: 15/954,898

(22) Filed: Apr. 17, 2018

(65) Prior Publication Data

US 2018/0232706 A1 Aug. 16, 2018

Related U.S. Application Data

(63) Continuation of application No. PCT/KR2017/004094, filed on Apr. 17, 2017.

(30) Foreign Application Priority Data

Feb. 16, 2017 (KR) .................... 10-2017-0021023

(51) Int. Cl.
*G06Q 10/00* (2012.01)
*G06Q 10/10* (2012.01)
(Continued)

(52) U.S. Cl.
CPC ......... *G06Q 10/1095* (2013.01); *G06F 1/163* (2013.01); *G06N 5/003* (2013.01); *G06N 5/04* (2013.01); *G06N 20/00* (2019.01)

(58) Field of Classification Search
None
See application file for complete search history.

(56) References Cited

U.S. PATENT DOCUMENTS 8,766,805 B2 * 7/2014 Alameh ............ G06F 15/0266
340/575
9,230,288 B2 * 1/2016 Elias .................. G06Q 10/1095
(Continued)

FOREIGN PATENT DOCUMENTS

JP 2005-100382 A 4/2005
JP 2007-271480 A 10/2007
(Continued)

OTHER PUBLICATIONS

P.Latha and R.Ramachandran (HDA: Heading Direction Angle based Multicast Routing for Mobile Adhoc Networks, 2009 IEEE International Advance Computing Conference (LI\CC 2009)). (Year: 2009).*

(Continued)

*Primary Examiner* — Hafiz A Kassim
(74) *Attorney, Agent, or Firm* — Studebaker & Brackett PC

(57) ABSTRACT

The present invention relates to a wearable sensor-based automatic scheduling device and method. The wearable sensor-based automatic scheduling device includes: a typical schedule setting part that sets a typical schedule received from the user and specifying a specific event; an atypical schedule inferring part that infers an atypical schedule by analyzing the user's current location and the user's behavioral patterns occurring over a specific period of time in the past; and a schedule determining part that determines the schedule from this point on based on the typical schedule and the atypical schedule. Accordingly, the present invention may provide a technology that can predict the user's expected schedule in real time by taking into account both a typical schedule recorded in a scheduler and an atypical schedule mapped out based on daily behavioral patterns.

14 Claims, 5 Drawing Sheets

(51) Int. Cl.
*G06F 1/16* (2006.01)
*G06N 5/04* (2006.01)
*G06N 5/00* (2006.01)
*G06N 20/00* (2019.01)

(56) References Cited

U.S. PATENT DOCUMENTS

| | | | | |
|---|---|---|---|---|
| 9,473,730 | B1* | 10/2016 | Roy | H04N 21/482 |
| 9,574,894 | B1* | 2/2017 | Karakotsios | H04W 4/023 |
| 10,055,887 | B1* | 8/2018 | Gil | G02B 27/017 |
| 2004/0064585 | A1* | 4/2004 | Doss | G06O 10/1097 |
| | | | | 709/246 |
| 2006/0155465 | A1* | 7/2006 | Jung | G01C 21/20 |
| | | | | 701/533 |
| 2006/0242154 | A1* | 10/2006 | Rawat | G06F 16/168 |
| 2007/0282618 | A1* | 12/2007 | Barahona | G06Q 10/08355 |
| | | | | 705/338 |
| 2008/0071465 | A1* | 3/2008 | Chapman | G01C 21/3691 |
| | | | | 701/117 |
| 2008/0076972 | A1* | 3/2008 | Dorogusker | G16H 20/30 |
| | | | | 600/300 |
| 2008/0104624 | A1* | 5/2008 | Narasimhan | H04H 60/66 |
| | | | | 725/13 |
| 2008/0165032 | A1* | 7/2008 | Lee | G01C 21/3484 |
| | | | | 340/988 |
| 2008/0306826 | A1* | 12/2008 | Kramer | G06Q 30/0212 |
| | | | | 705/14.14 |
| 2011/0099046 | A1* | 4/2011 | Weiss | G06Q 30/0205 |
| | | | | 705/7.31 |
| 2012/0088525 | A1* | 4/2012 | Kurokawa | H04W 4/029 |
| | | | | 455/456.5 |
| 2012/0100869 | A1* | 4/2012 | Liang | G06Q 30/0261 |
| | | | | 455/456.1 |
| 2012/0185419 | A1* | 7/2012 | Kuhn | H04M 1/72569 |
| | | | | 706/12 |
| 2012/0316456 | A1* | 12/2012 | Rahman | G06F 3/0346 |
| | | | | 600/547 |
| 2012/0316963 | A1* | 12/2012 | Moshfeghi | G06Q 20/327 |
| | | | | 705/14.58 |
| 2013/0226857 | A1* | 8/2013 | Shim | H04W 4/029 |
| | | | | 706/52 |
| 2013/0262171 | A1* | 10/2013 | Solodko | H04W 4/029 |
| | | | | 705/7.18 |
| 2014/0052681 | A1* | 2/2014 | Nitz | H04L 51/02 |
| | | | | 706/46 |
| 2014/0067455 | A1* | 3/2014 | Zhang | G06Q 10/109 |
| | | | | 705/7.24 |
| 2014/0128105 | A1* | 5/2014 | Su | H04W 4/029 |
| | | | | 455/456.3 |
| 2014/0188541 | A1* | 7/2014 | Goldsmith | H04L 67/306 |
| | | | | 705/7.19 |
| 2014/0229099 | A1* | 8/2014 | Garrett | H04W 4/029 |
| | | | | 701/465 |
| 2014/0274022 | A1* | 9/2014 | Bell | G06F 16/951 |
| | | | | 455/418 |
| 2015/0099946 | A1* | 4/2015 | Sahin | A61B 5/1123 |
| | | | | 600/301 |
| 2015/0116331 | A1* | 4/2015 | Armstrong | A61B 5/7282 |
| | | | | 345/440 |
| 2015/0193819 | A1* | 7/2015 | Chang | G06Q 10/1095 |
| | | | | 705/7.19 |
| 2016/0232244 | A1* | 8/2016 | Liu | G06F 3/011 |
| 2016/0248865 | A1* | 8/2016 | Dotan-Cohen | H04L 67/26 |
| 2016/0267439 | A1* | 9/2016 | Bitran | G06Q 10/1095 |
| 2016/0350812 | A1* | 12/2016 | Priness | G06Q 30/0269 |
| 2016/0371973 | A1* | 12/2016 | Holleczek | H04W 4/021 |
| 2017/0032248 | A1* | 2/2017 | Dotan-Cohen | H04L 67/306 |
| 2017/0034666 | A1* | 2/2017 | Priness | H04W 64/00 |
| 2017/0116552 | A1* | 4/2017 | Deodhar | G06Q 10/06316 |
| 2017/0140041 | A1* | 5/2017 | Dotan-Cohen | G06Q 10/101 |
| 2017/0140285 | A1* | 5/2017 | Dotan-Cohen | G06Q 10/04 |
| 2017/0171901 | A1* | 6/2017 | Melcher | G06Q 30/0631 |
| 2017/0372254 | A1* | 12/2017 | Vainas | G06Q 10/1093 |
| 2017/0372268 | A1* | 12/2017 | Ilan | G06Q 10/1095 |
| 2018/0005194 | A1* | 1/2018 | Dotan-Cohen | G06F 16/29 |
| 2018/0107962 | A1* | 4/2018 | Lundin | G06Q 10/06398 |
| 2018/0197150 | A1* | 7/2018 | Bender | G06Q 10/1095 |
| 2018/0285827 | A1* | 10/2018 | Dotan-Cohen | G06F 9/542 |

FOREIGN PATENT DOCUMENTS

| | | |
|---|---|---|
| JP | 2009-036594 A | 2/2009 |
| JP | 2015-011431 A | 1/2015 |
| KR | 10-2008-0064556 A | 7/2008 |
| KR | 10-2013-0092272 A | 8/2013 |
| KR | 10-2015-0024419 A | 3/2015 |
| WO | 2004/075137 A1 | 9/2004 |
| WO | 2014/112124 A1 | 7/2014 |
| WO | WO-2015131166 A1 * | 9/2015 ............ A01G 25/16 |

OTHER PUBLICATIONS

Chih-Pei Yang, Yi-Fan Chung, and Chung-Ta King (Destination-Aware Non-GPS Positioning using Predictive Contexts, 2012 12th International Conference on ITS Telecommunications). (Year: 2012).*

Katarzyna Sila-Nowickaa,b, Jan Vandrolc, Taylor Oshand, Jed A. Long a, Urška Demšara and A. Stewart Fotheringhamd (Analysis of human mobility patterns from GPS trajectories and contextual information, International Journal of Geographical Information Science, 2016)). (Year: 2016).*

Andreas Krause, Asim Smailagic, and Daniel P. Siewiorek et al. (Context-Aware Mobile Computing: Learning Context-Dependent Personal Preferences From a Wearable Sensor Array, IEEE Transactions on Mobile Computing, vol. 5, No. 2, Feb. 2006). (Year: 2006).*

Aleksandar Matic et al. (Sensing Social Interactions Using Non-Visual and Non-Auditory Mobile Sources, Maximizing Privacy and Minimizing Obtrusiveness, PhD Dissertation; May 2012). (Year: 2012).*

L. Atallah, M. ElHelw, J. Pansiot, D. Stoyanov, L. Wang, B. Lo, and G.Z. Yang et al. (Behaviour Profiling with Ambient and Wearable Sensing, Department of Computing, Imperial College, London, United Kingdom, 2007). (Year: 2007).*

* cited by examiner

WEARABLE SENSOR-BASED AUTOMATIC SCHEDULING DEVICE AND METHOD

CROSS-REFERENCE TO RELATED APPLICATIONS

The present application is a continuation of International Patent Application No. PCT/KR2017/004094, filed on Apr. 17, 2017, which is based upon and claims the benefit of priority to Korean Patent Application No. 10-2017-0021023, filed on Feb. 16, 2017. The disclosures of the above-listed applications are hereby incorporated by reference herein in their entirety.

TECHNICAL FIELD

The present invention relates to a schedule inference-based automatic scheduling technology, and more particularly, to a schedule inference-based automatic scheduling device and method which can set an atypical schedule inexplicitly inferred through analysis of a user's behavioral patterns, even if the user does not explicitly set a typical schedule.

BACKGROUND ART

These days, scheduling can be done through a smart device such as a smartphone. For example, the smart device is able to receive a specific schedule including a specific time and a specific place, register the particular schedule in a scheduling database, and give an alarm ahead of the specific time. An alarm time can be preset according to the user's convenience.

In the related art, however, scheduling is done only based on a typical schedule that is explicitly entered by the user, and the user's past behavioral patterns are used only for the purpose of collecting statistics.

Therefore, there is a demand for the development of a technology that allows for setting an atypical schedule that is inexplicitly inferred through analysis of a user's behavioral patterns, even if it is not explicitly set, along with a schedule explicitly set by the user.

DISCLOSURE

Technical Problem

An exemplary embodiment of the present invention provides a schedule inference-based automatic scheduling device and method which can set an atypical schedule inexplicitly inferred through analysis of a user's behavioral patterns, even if the user does not explicitly set a typical schedule.

An exemplary embodiment of the present invention provides a schedule inference-based automatic scheduling device and method which can predict the user's expected schedule in real time by taking into account both a typical schedule recorded in a scheduler and an atypical schedule mapped out based on daily behavioral patterns.

An exemplary embodiment of the present invention provides a schedule inference-based automatic scheduling device and method which can predict the user's expected schedule in real time by detecting a place frequently visited during a specific time slot and inferring an atypical schedule.

Technical Solution

In an aspect of the present invention, a schedule inference-based automatic scheduling device includes: a typical schedule setting part that sets a typical schedule received from the user and specifying a specific event; an atypical schedule inferring part that infers an atypical schedule by analyzing the user's current location and the user's behavioral patterns occurring over a specific period of time in the past; and a schedule determining part that determines the schedule from this point on based on the typical schedule and the atypical schedule.

The atypical schedule inferring part may determine an atypical schedule candidate by detecting a place frequently visited by the user with more than a specific level of regularity over a specific period of time in the past.

The atypical schedule inferring part may calculate the distance between the user's current location and the frequently visited place and infers the atypical schedule candidate as the atypical schedule once the level of regularity is reached.

The atypical schedule inferring part may detect a related visited place that was visited more than a given number of times or more that is within a specific amount of time and distance from the frequently visited place.

If the frequently visited place is being accessed from the user's current location, the atypical schedule inferring part may select the related visited place as an atypical schedule candidate.

The schedule determining part may produce a schedule reward map for the schedule from this point on by using the weighted sum of a reward for the set typical schedule and a reward for the inferred atypical schedule.

The schedule determining part may select a schedule with the highest reward value as the user's next schedule from the produced schedule reward map.

The schedule determining part may determine the user's expected schedule by selecting events with the highest reward value from the schedule reward map, in chronological order based on the user's next schedule selected.

In another aspect of the present invention, a schedule inference-based automatic scheduling method including: setting a typical schedule received from the user and specifying a specific event; inferring an atypical schedule by analyzing the user's current location and the user's behavioral patterns occurring over a specific period of time in the past; and determining the schedule from this point on based on the typical schedule and the atypical schedule.

In the inferring of an atypical schedule, an atypical schedule candidate may be determined by detecting a place frequently visited by the user with more than a specific level of regularity over a specific period of time in the past.

In the inferring of an atypical schedule, the distance between the user's current location and the frequently visited place may be calculated, and the atypical schedule candidate may be inferred as the atypical schedule once the level of regularity is reached.

In the inferring of an atypical schedule, a related visited place that was visited more than a given number of times may be detected that is within a specific amount of time and distance from the frequently visited place.

In the inferring of an atypical schedule, if the frequently visited place is being accessed from the user's current location, the related visited place may be selected as an atypical schedule candidate.

In the determining of the schedule from this point on, a schedule reward map for the schedule from this point on may be produced by using the weighted sum of a reward for the set typical schedule and a reward for the inferred atypical schedule.

In the determining of the schedule from this point on, a schedule with the highest reward value may be selected as the user's next schedule from the produced schedule reward map.

In the determining of the schedule from this point on, the user's expected schedule may be determined by selecting events with the highest reward value from the schedule reward map, in chronological order based on the user's next schedule selected.

Advantageous Effects

The disclosed technology has the following effects. However, this does not mean that a specific exemplary embodiment should have all of or only these effects. Therefore, the scope of the disclosed technology should not be construed as being limited to these effects.

A schedule inference-based automatic scheduling device and method according to an exemplary embodiment of the present invention provide a technology that can set an atypical schedule inexplicitly inferred through analysis of user's behavioral patterns, even if the user does not explicitly set a typical schedule.

A schedule inference-based automatic scheduling device and method according to an exemplary embodiment of the present invention provide a technology that can predict the user's expected schedule in real time by taking into account both a typical schedule recorded in a scheduler and an atypical schedule mapped out based on daily behavioral patterns.

MODE FOR INVENTION

Figure 1:
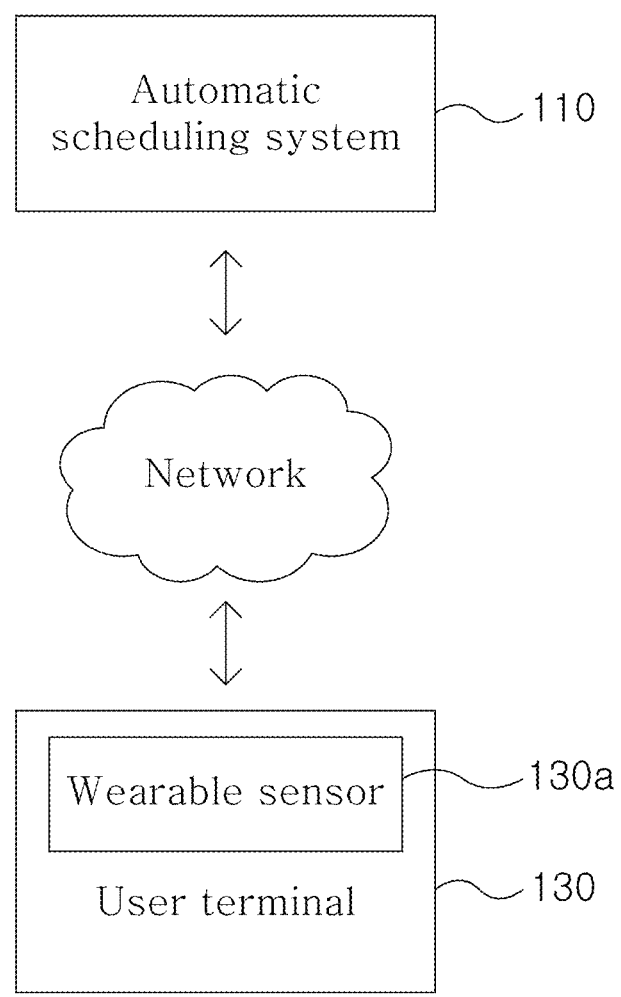
FIG. 1 is a view showing an automatic scheduling system according to an exemplary embodiment of the present invention.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, activities, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

The present invention may be implemented as computer-readable codes on computer-readable recording media. The computer readable recording media may be any data storage devices that can store data that can be thereafter read by a computer system. Examples of the computer-readable recording medium include ROM, RAM, CD-ROM, magnetic tapes, floppy disks, optical data storage, etc. Further, the computer-readable recording medium may be distributed over computer systems coupled via a network so that the computer-readable codes can be stored and executed in a distributed fashion.

Unless otherwise defined herein, all terms used herein including technical or scientific terms have the same meanings as those generally understood by a person skilled in the art. Terms defined in dictionaries generally used should be construed to have meanings matching with contextual meanings in the related art and are not to be construed as having an ideal or excessively formal meaning unless otherwise defined herein.

FIG. 1 is a view showing an automatic scheduling system according to an exemplary embodiment of the present invention.

Referring to FIG. 1, the automatic scheduling system 100 includes an automatic scheduling device 110 and a user terminal 130.

The automatic scheduling device 110 may predict the user's schedule from this point on and inform the user of the schedule via a network. The automatic scheduling device 110 may determine an expected schedule and provide the user with it, regardless of whether a user request has been made or not.

In an exemplary embodiment, the user terminal 130 may be implemented as a smartphone, and may work in conjunction with a wearable sensor 130a. The wearable sensor 130a may be included in the user terminal, or may be worn on the user's body and connected via wireless communication such as Bluetooth. Here, the wearable sensor may be used to detect the user's behavioral patterns, and may detect changes in the user's body and ambient environmental information through at least one among physical, chemical, and biological means. In another exemplary embodiment, the user terminal 130 may be implemented as a wearable device. Here, the wearable device is a compound word of "wearable" and "device, which may represent an electronic device that can be worn on the user's body, like a clothes, glasses, a watch, etc. The user terminal 130 may be wirelessly connected to the automatic scheduling device 110 via Bluetooth, WiFi, etc., and may receive an expected schedule from the automatic scheduling device 110 according to the user's request.

Figure 2:
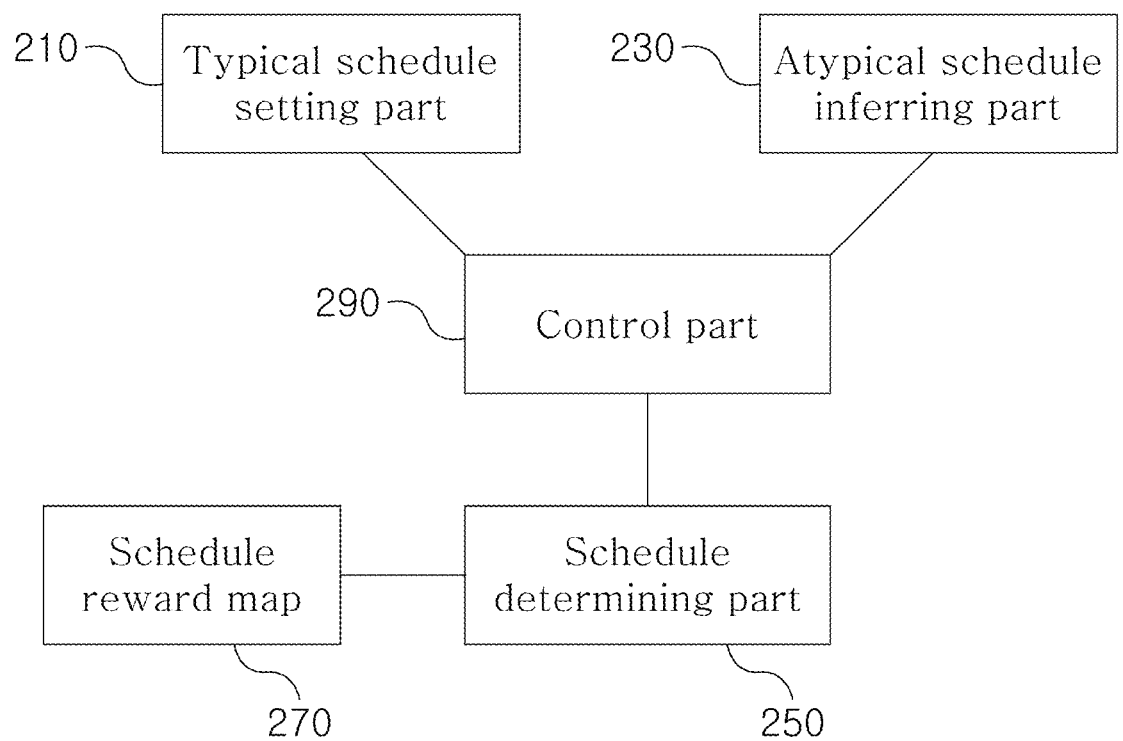
FIG. 2 is a block diagram illustrating the automatic scheduling device of FIG. 1.

FIG. 2 is a block diagram illustrating the automatic scheduling device of FIG. 1.

Referring to FIG. 2, the automatic scheduling device 110 includes a typical schedule setting part 210, an atypical schedule inferring part 230, a schedule determining part 250, a schedule reward map 270, and a control part 290.

The typical schedule setting part 210 may set up a specific schedule input or received by the user as a typical schedule. The typical schedule is a fixed schedule set at this point in time by which the user is supposed to visit a specific place or do a specific activity at a specific time. For example, meeting with friends or a business meeting may correspond to a typical schedule.

The atypical schedule inferring part 230 may infer an atypical schedule for a period of time when there is no typical schedule by analyzing the user's past behavioral patterns occurring over a period of time. The atypical schedule is a schedule by which it can be predicted where and what the user is going to do at a specific time by analyzing the past behavioral patterns, since there is no schedule set at this point in time by which where and what the user is going to do at a specific time. The atypical schedule inferring part 230 may analyze the user's past behavioral patterns based on the fact that the user visited a specific place or did a specific activity at a specific time.

In one exemplary embodiment, the atypical schedule inferring part 230 may determine an atypical schedule candidate by detecting a place frequently visited by the user with more than a specific level of regularity over a specific period of time in the past. The atypical schedule candidate is a preliminary schedule from which the atypical schedule is to be inferred. Since the user is highly likely to act on their past behavioral patterns, chances are high that they may act on the atypical schedule candidate.

In one exemplary embodiment, the atypical schedule inferring part 230 may calculate the distance between the user's current location and the frequently visited place and infer the atypical schedule candidate as the atypical schedule once the level of regularity is reached. The atypical schedule inferring part 230 may calculate the range within which the user can move from the current location via typical transportation means within a given period of time. The atypical schedule inferring part 230 may infer, from the presence of a frequently visited place within that calculated range, that the user is far more likely to visit that frequently visited place from this point on than other places.

In one exemplary embodiment, the atypical schedule inferring part 230 may detect a related visited place that was visited more than a given number of times that is within a specific amount of time and distance from the frequently visited place. The related visited place is a place the user is most likely to visit according to the user's past behavioral patterns after visiting the frequently visited place. The atypical schedule inferring part 230 may refer to the given number of times which is counted based on the user's past behavioral patterns or which is set by the automatic scheduling device 110.

In one exemplary embodiment, if the frequently visited place is being accessed from the user's current location, the atypical schedule inferring part 230 may select the related visited place as an atypical schedule candidate. If the frequently visited place is being accessed from the user's current location, this means that the user is currently moving toward the frequently visited place. The atypical schedule inferring part 230 may select the related visited place as an atypical schedule candidate, considering that the user is highly likely to move to the related visited place according to the past behavioral patterns after visiting the frequently visited place.

The schedule determining part 250 may determine the schedule from this point on based on a typical schedule and an atypical schedule. The user's expected schedule includes visiting a specific place or doing a specific activity at a specific time.

In one exemplary embodiment, the schedule determining part 250 may produce a schedule reward map for the schedule from this point on by using the weighted sum of a reward for the set typical schedule and a reward for the inferred atypical schedule. The schedule determining part 250 may compute a reward for a schedule by quantifying the gain from the user's acting on that schedule. A weighted sum refers to a value obtained by multiplying each factor by a weighted value.

In one exemplary embodiment, the schedule determining part 250 may select a schedule with the highest reward value as the user's next schedule from the produced schedule reward map. The schedule that the user is most likely to act on from this point on is the one with the highest reward value in the schedule reward map.

In one exemplary embodiment, the schedule determining part 250 may determine the user's expected schedule by selecting events with the highest reward value from the schedule reward map, in chronological order based on the user's next schedule selected. Here, a set of events selected in chronological order may correspond to a schedule. Since the schedule reward map is produced considering both the user's past behavioral patterns and the typical schedule, the events with the highest reward value are the ones the user is most likely to perform from this point on. A method for determining an expected schedule from this point on for which the highest reward value is given will be described later in detail with reference to FIG. 3

The schedule reward map 270, which is produced by the schedule determining part 250, is a table that shows rewards that can be obtained when the user is in a specific place at a specific time. A method for producing a schedule reward map will be described later in detail with reference to FIG. 3.

The control part 290 may control the overall operation of the automatic scheduling device 110, and also may control the control flow or data flow among the typical schedule setting part 210, the atypical schedule inferring part 230, and the schedule determining part 250.

Figure 3:
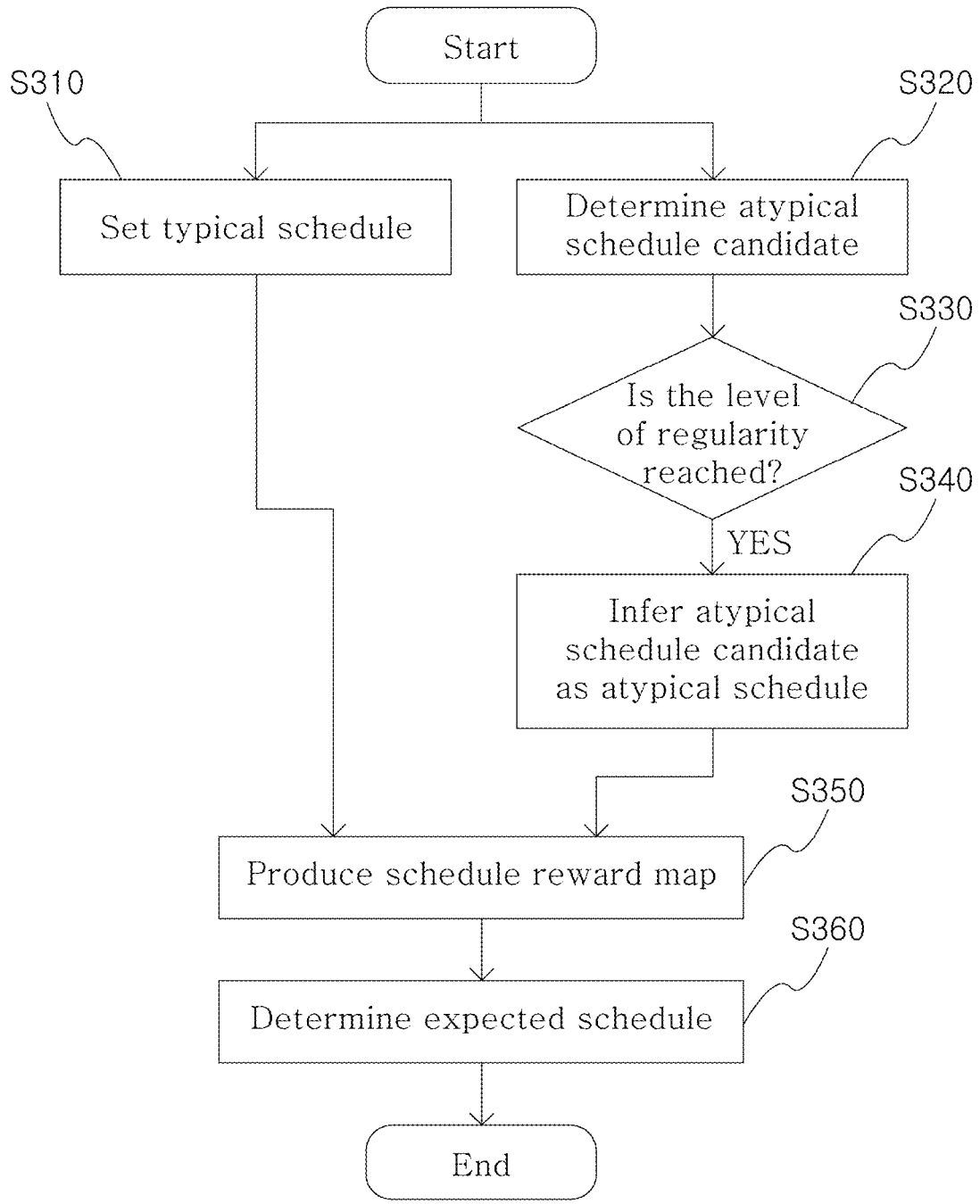
FIG. 3 is a flowchart illustrating a process for the automatic scheduling device of FIG. 2 to determine the user's expected schedule.

FIG. 3 is a flowchart illustrating a process for the automatic scheduling device of FIG. 2 to determine the user's expected schedule.

Referring to FIG. 3, the automatic scheduling device 110 may receive a typical schedule from the user through the typical schedule setting part 210, or may set a typical schedule based on schedule information received from the user terminal (step S310). The user may input a typical schedule directly, or schedule information collected from a calendar, emails, SNS, etc. stored on the user's phone may be set up as a typical schedule. For example, if the user has a fixed plan, like meeting with friends, having an office meeting, going to school, etc., this is a typical schedule.

The automatic scheduling device 110 determines an atypical schedule candidate through the atypical schedule inferring part 230 (step S320). The atypical schedule refers to a schedule that is highly likely to become an atypical schedule because of the high chances of the user acting on it at this point in time, considering the user's past behavioral pattern.

In one exemplary embodiment, the atypical schedule inferring part 230 may determine an atypical schedule candidate by detecting a place frequently visited by the user with more than a specific level of regularity over a specific period of time in the past. For example, if there is a place that is visited more than three times during the same hours of the day over the past week, this place becomes a frequently visited place, and a schedule including the time of the visit and the frequently visited place becomes an atypical schedule candidate.

In one exemplary embodiment, the atypical schedule inferring part 230 may detect a related visited place that was visited more than a given number of times that is within a specific amount of time and distance from the frequently visited place, and if the frequently visited place is being accessed from the user's current location, the atypical schedule inferring part 230 may select the related visited place as an atypical schedule candidate.

The automatic scheduling device 110 checks whether the level of regularity is reached by calculating the distance between the user's current location and a frequently visited place (S330). The user may set the level of regularity on the automatic scheduling device 110. The level of regularity may be changed based on the user's past behavioral patterns; for example, if the user moves often, the number of visits is high, the time length of visits is short, and the distance from the user is short.

The automatic scheduling device 110 infers the atypical schedule candidate as an atypical schedule through the atypical schedule inferring part 230 once the level of regularity is reached (Step S340). The atypical schedule inferring part 230 may calculate the range within which the user can move from the current location via typical transportation means within a given period of time. The atypical schedule inferring part 230 may infer, from the presence of a frequently visited place within that calculated range, that the user is far more likely to visit that frequently visited place from this point on than other places.

The automatic scheduling device 110 produces a schedule reward map 270 through the schedule determining part 250, based on a set typical schedule and an inferred atypical schedule (Step S350). Reward values for schedules can be computed by a reward function R(s,t). To obtain the reward function R(s,t), the reward values w that can be obtained for each event, place, and activity are learned. Such learning is a kind of inverse reinforcement learning. R_1(s,t) is probability distribution p(s,t), and R_2(s,t) is a function delta(s,t) defined by an atypical schedule. The probability distribution p(s,t) for R_1(s,t) can be computed by the counts for a time and place. The reward function R can be defined as the weighted sum of R_1 and R_2. R_1, R_2, and R can be defined as follows:

$$R_1(s,t) = p(s,t)$$

$$R_2(s,t) = \delta(s(t), c(t))$$

$$R = w_1 \cdot R_1 + w_2 \cdot R_2 \quad \text{[Equation 1]}$$

where R is the reward function, p is the probability distribution, delta is a function defined by a typical schedule, s is place, t is time, c(t) is an activity at a time, and w1 and w2 are weighted values.

The automatic scheduling device 110 determines the user's expected schedule from this point on through the schedule determining part 250, based on the schedule reward map 270 (Step S360). The user's expected schedule may be determined by selecting events with the highest reward value with respect to the current time from the schedule reward map. If the time it takes to go from place s to another place s' is D(s,s'), D(s,s') may be obtained using a maps app, for example. A target function is defined as follows for place $S_{1:T}$ until the end T of scheduling:

$$obj_{infer}(s_{1:t}) = \sum_{t=1}^{T} R(s_p t) \quad \text{[Equation 2]}$$

where $obj_{infer}$ is the expected schedule, R is the reward function, s is place, and t is time.

To optimize the above target function, a cumulative reward $V(S_t, t)$, which is the maximum value of an expected reward that can be obtained for each s and t after the time t. That is, V is the largest sum of reward values that can be obtained until the time T when the reward function R exists. If V exists, an optimal path $S_{1:T}$ can be obtained. Provided that a reward −p corresponding to a penalty for movement is obtained, V is then computed as follows:

$$V(s_p t) = \max_{s'} [-D(s',s) \cdot p + V(s_{t+D(s',s)})] + R(s_p t) \quad \text{[Equation 3]}$$

where V is the cumulative reward, D is the travel time, R is the reward function, s is place, and t is time.

Figure 4:
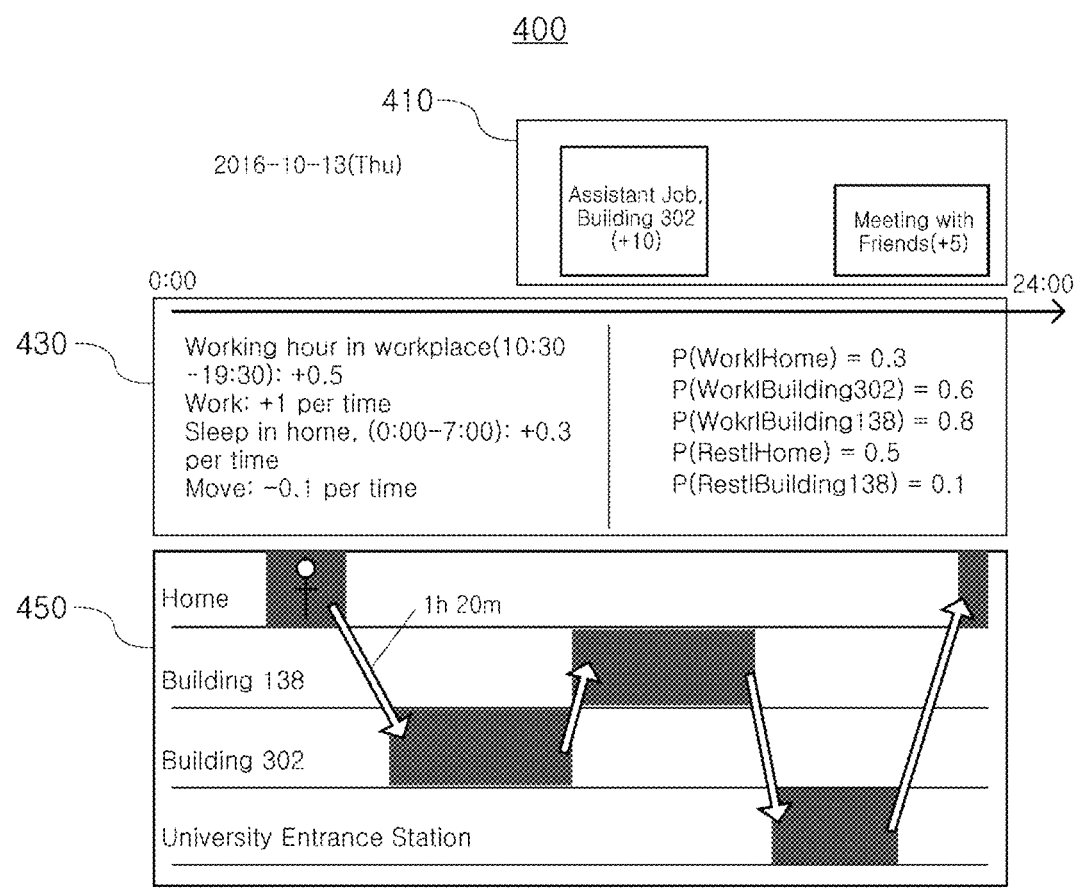
FIG. 4 is a schematic view of the user's expected schedule in a test for a process of determining the user's expected schedule according to the present invention.

FIG. 4 is a schematic view of the user's expected schedule in a test for a process of determining the user's expected schedule according to the present invention.

Referring to FIG. 4, the automatic scheduling device 110 may determine the user's expected schedule by selecting events with the highest reward value in chronological order, based on a typical schedule 410 and an atypical schedule 430. The automatic scheduling device 110 provides prediction results through the process of optimizing the reward function for each event in an inference situation, and learns the reward function for each event in a learning situation.

Figure 5A:
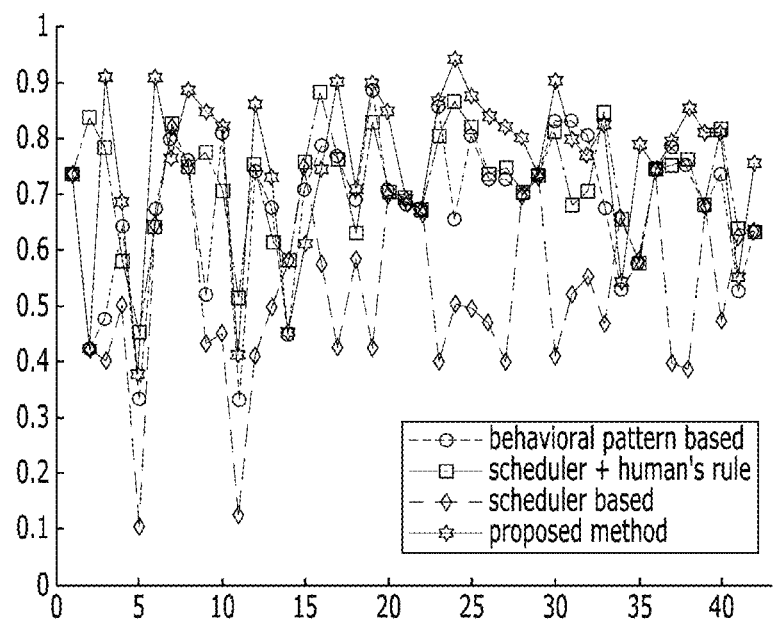
FIGS. 5A and 5B are diagrams comparing the predicted performance of each schedule prediction model.
Figure 5B:
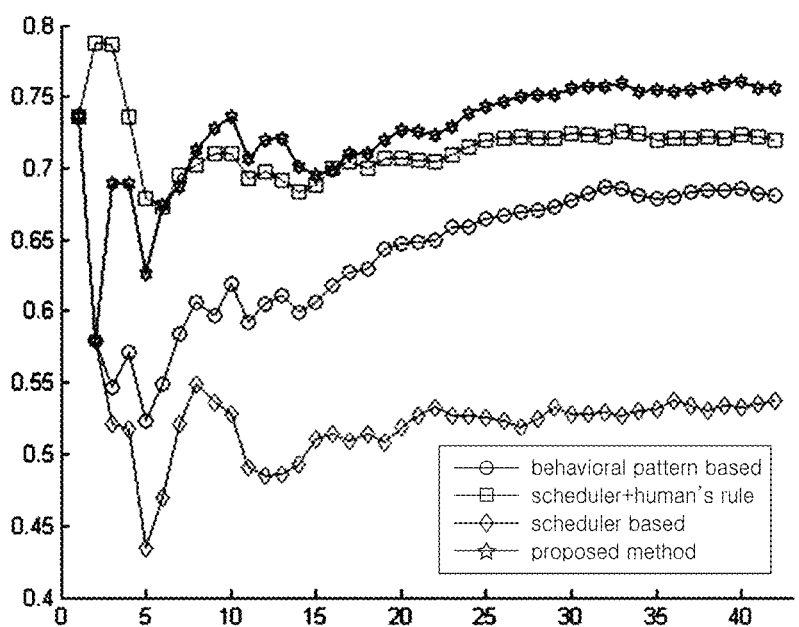

FIGS. 5A and 5B are diagrams comparing the predicted performance of each schedule prediction model.

Referring to FIGS. 5A and 5B, a performance comparison test was conducted on a subject, based on data on the places the subject went to, activities, and events which has been collected for 42 days. FIGS. 5A and 5B show test results obtained for 42 days. In FIG. 5A, the X-axis denotes date and the Y-axis denotes accuracy. In FIG. 5B, the X-axis denotes date and the Y-axis denotes cumulative accuracy. The behavioral pattern based is a model that makes a prediction based on a probability model. The scheduler based is a model that makes a prediction based on schedule information. The scheduler+human's rule is a model that makes a prediction based on a schedule information-based model combined with a routine rule the subject thinks it should follow. The performance of the models according to the present invention is improving over time.

Although preferred embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

The exemplary embodiments of the present invention relate to a wearable sensor-based automatic scheduling device and method, and may apply to a wearable sensor-based automatic scheduling device and method which can predict a user's expected schedule in real time by taking into account both a typical schedule recorded in a scheduler and an atypical schedule mapped out based on daily behavioral patterns.

The invention claimed is:

1. A schedule inference-based automatic scheduling device comprising:
a processor configured to:
set a typical schedule received from a user terminal connected with a wearable sensor, wherein the typical schedule specifies a specific event;
infer an atypical schedule by analyzing a current location and behavioral patterns of a user of the user terminal, wherein the behavioral patterns are patterns of behaviors performed by the user during a specific period of time are detected by the wearable sensor;
detect by the wearable sensor based on changes in a user's body and ambient environmental information through at least one of physical, chemical, and biological means;
determine in real-time a future schedule based on the typical schedule and the atypical schedule; and
transmit in real-time information on the determined future schedule to the user terminal with the wearable sensor via a network,
wherein
the processor is further configured to produce a schedule reward data of the determined future schedule, based on outputs of a reward function, which calculates a weighted sum of a reward for the typical schedule and a reward for the atypical schedule,
the reward for the typical schedule is calculated by using a delta function, and
the reward for the atypical schedule is calculated by using a probability distribution function.

2. The schedule inference-based automatic scheduling device of claim 1, wherein the processor is further configured to determine an atypical schedule candidate by detecting a place frequently visited by the user with more than a specific level of regularity over the specific period of time.

3. The schedule inference-based automatic scheduling device of claim 2, wherein the processor is further configured to
calculate a distance between the current location of the user and the frequently visited place, and
infer the atypical schedule candidate as the atypical schedule when the specific level of regularity is reached.

4. The schedule inference-based automatic scheduling device of claim 2, wherein the processor is further configured to detect a related visited place that was visited more than a given number of times that is within a specific amount of time and distance from the frequently visited place.

5. The schedule inference-based automatic scheduling device of claim 4, wherein, when the frequently visited place is being accessed from the current location of the user, the processor is further configured to select the related visited place as the atypical schedule candidate.

6. The schedule inference-based automatic scheduling device of claim 1, wherein the processor is further configured to select a schedule with the highest reward value as the user's next schedule from the produced schedule reward data.

7. The schedule inference-based automatic scheduling device of claim 6, wherein the processor is further configured to determine the user's expected schedule by selecting events with the highest reward value from the schedule reward data, in chronological order based on the user's next schedule selected.

8. A schedule inference-based automatic scheduling method comprising:
setting, by a processor of a schedule inference-based automatic scheduling device, a typical schedule received from a user terminal connected with a wearable sensor, wherein the typical schedule specifies a specific event;
inferring, by the processor, an atypical schedule by analyzing a current location and behavioral patterns of a user of the user terminal, wherein the behavioral patterns are patterns of behaviors performed by the user during a specific period of time and are detected by the wearable sensor;
detecting, by the processor of the wearable sensor based on changes in a user's body and ambient environmental information through at least one of physical, chemical, and biological means;
determining in real-time, by the processor, a future schedule based on the typical schedule and the atypical schedule; and
transmitting in real-time, from the schedule inference-based automatic scheduling device to the user terminal with the wearable sensor, via a network, by the processor, information on the determined future schedule,
wherein the determining comprises:
calculating a reward for the typical schedule using a delta function;
calculating a reward for the atypical schedule by using a probability distribution function; and
producing a schedule reward data of the determined future schedule, based on outputs of a reward function, which calculates a weighted sum of the reward for the typical schedule and the reward for the atypical schedule.

9. The schedule inference-based automatic scheduling method of claim 8, wherein the inferring comprises:
determining an atypical schedule candidate by detecting a place frequently visited by the user with more than a specific level of regularity over the specific period of time.

10. The schedule inference-based automatic scheduling method of claim 9, wherein the inferring further comprises:

calculating a distance between the current location of the user and the frequently visited place; and inferring the atypical schedule candidate as the atypical schedule when the specific level of regularity is reached.

11. The schedule inference-based automatic scheduling method of claim 9, wherein the inferring further comprises:

detecting a related visited place that was visited more than a given number of times that is within a specific amount of time and distance from the frequently visited place.

12. The schedule inference-based automatic scheduling method of claim 11, wherein the inferring further comprises:

when the frequently visited place is being accessed from the current location of the user, selecting the related visited place as the atypical schedule candidate.

13. The schedule inference-based automatic scheduling method of claim 8, wherein the determining further comprises:

selecting a schedule with the highest reward value is selected as the user's next schedule from the produced schedule reward data.

14. The schedule inference-based automatic scheduling method of claim 13, wherein the determining further comprises:

determining the user's expected schedule is determined by selecting events with the highest reward value from the schedule reward data, in chronological order based on the user's next schedule selected.

* * * * *